(12) United States Patent
Radu (10) Patent No.: US 10,421,354 B2
(45) Date of Patent: Sep. 24, 2019

(54) FILLING PIPE ARRANGEMENT, ESPECIALLY FOR AN AUTOMOTIVE SCR FLUID TANK, WITH MOVABLE MAGNETIC ARRANGEMENT

(71) Applicant: Röchling Automotive SE & Co. KG, Mannheim (DE)

(72) Inventor: Andi-Ionut Radu, Arges (RO)

(73) Assignee: Röchling Automotive SE & Co. KG, Mannheim (DE)

( * ) Notice: Subject to any disclaimer, the term of this patent is extended or adjusted under 35 U.S.C. 154(b) by 107 days.

(21) Appl. No.: 15/784,145

(22) Filed: Oct. 15, 2017

(65) Prior Publication Data

US 2018/0105035 A1 Apr. 19, 2018

(30) Foreign Application Priority Data

Oct. 19, 2016 (DE) .......................... 10 2016 220 463

(51) Int. Cl.
*B60K 15/04* (2006.01)
*F01N 3/20* (2006.01)
(Continued)

(52) U.S. Cl.
CPC .............. *B60K 15/04* (2013.01); *B60K 13/04* (2013.01); *F01N 3/2066* (2013.01);
(Continued)

(58) Field of Classification Search
CPC .................... B60K 15/04; B60K 13/04; B60K 2015/03289; B60K 2015/0458; F01N 2610/1413
See application file for complete search history.

(56) References Cited

U.S. PATENT DOCUMENTS 7,644,723 B2 1/2010 Zsigmond
9,463,971 B2 * 10/2016 Higgins ................ B67D 7/365
(Continued)

FOREIGN PATENT DOCUMENTS

DE 102004007025 A1 9/2005
EP 2719567 A1 4/2014

OTHER PUBLICATIONS

German Search Report for corresponding DE 10 2016 220 463.7 dated Jun. 22, 2017, 9 pgs.
(Continued)

*Primary Examiner* — Timothy P. Kelly
(74) *Attorney, Agent, or Firm* — Rankin, Hill & Clark LLP (57) ABSTRACT

A filling pipe arrangement for filling an automobile fluid tank with fluid, especially aqueous urea solution, with a passage passing through a predetermined passageway along the filling pipe arrangement, wherein the passage extends from an inserting mouth to a discharge opening, wherein an inserting end section of the passage comprising the inserting mouth is designed to hold at least temporarily an output end section of a delivery device, such as a spigot, a Kruse bottle, or the like, wherein the passage comprises, at a distance from the inserting mouth, a conducting section designed to lead fluid introduced into the filling pipe arrangement through the filling pipe arrangement, wherein the filling pipe arrangement comprises a magnetic arrangement whose magnetic field reaches into the passage in one section of the passageway, the magnetic arrangement is received in the filling pipe arrangement so that it is movable along the passageway.

17 Claims, 3 Drawing Sheets

(51) Int. Cl.
*B60K 13/04* (2006.01)
*B60K 15/03* (2006.01)

(52) U.S. Cl.
CPC ............ *B60K 2015/03289* (2013.01); *B60K 2015/0458* (2013.01); *B60Y 2410/132* (2013.01); *F01N 2610/02* (2013.01); *F01N 2610/1406* (2013.01); *F01N 2610/1413* (2013.01); *Y02A 50/2325* (2018.01); *Y02T 10/24* (2013.01)

(56) References Cited

U.S. PATENT DOCUMENTS

2006/0260683 A1* 11/2006 Zsigmond ............ F16K 21/185
 137/172
2013/0306665 A1* 11/2013 Eberhardt ............ B60K 15/04
 220/746
2015/0251893 A1* 9/2015 Jonasson ................ B67D 7/46
 141/1

OTHER PUBLICATIONS

Espacenet Bibliographic data: DE102004007025 (A1), Published Sep. 29, 2005, 1pg.
Espacenet Bibliographic data:EP2719567 (A1), Published Apr. 16, 2014, 2pgs.

* cited by examiner

FILLING PIPE ARRANGEMENT, ESPECIALLY FOR AN AUTOMOTIVE SCR FLUID TANK, WITH MOVABLE MAGNETIC ARRANGEMENT

The present invention concerns a filling pipe arrangement for filling an automobile fluid tank with fluid, especially aqueous urea solution, with a passage passing through a predetermined passageway along the filling pipe arrangement, wherein the passage extends from an inserting mouth to a discharge opening, wherein an inserting end section of the passage comprising the inserting mouth is designed to hold at least temporarily an output end section of a delivery device, such as a spigot, a Kruse bottle, or the like, wherein the passage comprises, at a distance from the inserting mouth, a conducting section designed to lead fluid introduced into the filling pipe arrangement through the filling pipe arrangement, and wherein the filling pipe arrangement comprises a magnetic arrangement whose magnetic field reaches into the passage in one section of the passageway.

BACKGROUND OF THE INVENTION

A filling pipe arrangement of this kind, known in the prior art as a "filling head" or the like, is known for example from EP 2 719 567 A1.

Such filling pipe arrangements make it possible to introduce the output end section of the delivery device into the passage at their end away from the tank, i.e., the lengthwise end closer to the inserting mouth, in order to pour in the fluid being delivered into the automotive fluid tank connected to the filling pipe arrangement with the fewest possible losses. Precisely in the case of the operating fluid which is preferably considered, namely, aqueous urea solution for selective catalytic exhaust gas cleaning, the avoidance of losses serves not only for the most effective use of the operating fluid, but also the avoidance of nuisance odor outside the filling pipe arrangement and outside the automotive fluid tank for users of the respective vehicle or attending and maintenance personnel working on the vehicle.

After introducing the output end section into the inserting end section of the filling pipe arrangement, the delivery device can discharge the fluid being delivered directly into the passage of the filling pipe arrangement. For this, one region of the passage is fashioned as a conducting section, which takes the operating fluid discharged from the output end section through the filling pipe arrangement until it finally emerges at the discharge opening.

At the discharge opening, either the volume of a tank connected to the filling pipe arrangement may be present directly, or there may be a further pipeline section, for example, one in the form of a pipe or hose attached to the filling pipe arrangement, which takes the fluid emerging from the discharge opening further onward to the tank.

Precisely in the application for aqueous urea solution as the preferred operating fluid, the conducting of this operating fluid through the filling pipe arrangement occurs with large volume flow of up to 40 liters or more per minute, which may result in intense secondary reactions, such as sloshing of the fluid in the tank, overflow, and so-called "spit-back". These secondary effects in turn may lead to undesirable emergence of fluid already introduced into the filling pipe arrangement or even into the automotive fluid tank.

The filling pipe arrangement of this kind has a magnetic arrangement whose magnetic field reaches into the passage so that with the aid of the magnetic arrangement it is possible to detect the proper presence of the output end section of the delivery device, from which further consequences for the subsequent filling process may be inferred.

For example, the output end section of the delivery device may be outfitted with a valve responding to the magnetic field of the magnetic arrangement, which only allows a passage of operating fluid in the delivery direction to the discharge opening when the output end section and the magnetic arrangement assume a predetermined relative position, which is advantageously the case only when the output end section of the delivery device is properly introduced into the inserting end section.

The valve may be passive in design, i.e., upon reaching the predetermined relative position between output end section and magnetic arrangement the valve is moved by the magnetic field of the magnetic arrangement from a closed position to an opening position and remains there for as long as the predetermined relative position between output end section and magnetic arrangement continues. It may thus be prevented that a delivery of operating fluid continues when the output end sections is pulled out from the inserting mouth of the filling pipe arrangement even though, based on the change in position of the output end section, a correct filling of the operating fluid into the filling pipe arrangement is no longer assured.

The aforementioned large delivery volumes of modern delivery devices and the concomitant secondary effects furthermore make it essential to carefully watch the filling process in order to prevent an overflow of the automotive fluid tank being filled or quite generally an escaping of operating fluid against the delivery direction from the inserting mouth. Here as well interactions between the fluid filled with high volume flow rates into the tank and the gas displaced in this way from the tank and the filling pipe arrangement play a major role.

Therefore, the problem which the present invention proposes to solve is to modify the filling pipe arrangement of this kind so that an escaping of operating fluid against the delivery direction from the inserting mouth of the filling pipe arrangement is prevented as reliably as possible with the most simple and economical means possible during a filling process.

SUMMARY OF THE INVENTION

This problem is solved according to the present invention by a filling pipe arrangement of the above mentioned kind, in which a magnetic arrangement is received in the filling pipe arrangement so that it is movable along the passageway.

Thanks to the movable holding of the magnetic arrangement in the filling pipe arrangement the relative position of the magnetic arrangement relatively to the passage, such as relatively to the inserting mouth, can be changed on the side with the filling pipe arrangement so that in event of an output end section of the delivery device introduced into the inserting end section the magnetic arrangement can also be moved relative to this output end section without there being a relative movement between output end section and filling pipe arrangement. Thus, an end to the delivery of the delivery device can be forced by local changing of the magnetic field emanating from the magnetic arrangement thanks to a movement of the magnetic arrangement along the passageway.

Basically, the magnetic arrangement can be moved by the most diverse of mechanisms relative to the passage. For example, it may be provided that an operating situation of the filling pipe arrangement or the fluid tank interacting with it is detected and depending on the detection the magnetic arrangement is moved by an actuator. However, this theoretically possible solution requires a substantial expense. Furthermore, with sensors and actuators there are mechanisms involved which need to be protected against possibly chemically corrosive operating fluids, which further increases the already large expense.

Preferably, the magnetic arrangement can be moved by the operating fluid itself, which not only results in an advantageous direct cause and effect relation between the operating situation of the filling pipe arrangement and a consequent forced end to the delivery with no use of sensor detection and actuator positioning, but also at the same time significantly simplifies the construction of the filling pipe arrangement.

Since, for an unwanted escaping of fluid from the inserting mouth, the operating fluid must first rise up against the delivery direction of the discharge opening toward the inserting mouth, it is advantageous for a movement of the magnetic arrangement in the filling pipe arrangement to prevent an unwanted escape of fluid from the filling pipe arrangement that the filling pipe arrangement has a float arrangement which is received in the filling pipe arrangement and able to move along the passageway, the magnetic arrangement being connected to the float arrangement for joint movement along the passageway.

The float arrangement can then be moved through simple buoyancy by the operating fluid rising undesirably in the filling pipe arrangement. Thanks to the magnetic arrangement moved with the float arrangement, it is possible to bring about an end to the delivery of the delivery device, as mentioned above, so that in a critical operating situation of the filling pipe arrangement and the automotive fluid tank connected to it no further operating fluid is delivered to make the situation worse.

The magnetic arrangement is preferably a current-free permanent magnetic arrangement, in order to provide a magnetic field without energy supplied from the outside.

In order to provide a homogeneously strong magnetic field, the magnetic arrangement can have a plurality of permanent magnets, which can be arranged for example on the float arrangement or incorporated in it, such as by casting on or casting around it in the injection molding process. Preferably the magnetic arrangement is a ring-shaped permanent magnetic arrangement, which encircles the passage. To avoid needlessly high numbers of components, the magnetic arrangement is preferably formed by one ring-shaped permanent magnet.

For the secure guiding of the float arrangement for a movement along the passageway, preferably at least one section of the float arrangement surrounds a lengthwise region of the conducting section radially on the outside. Thus, the conducting section, which may be formed as a pipe, especially a plastic pipe, may serve in simple manner as a movement guide for the float arrangement and thus indirectly for the magnetic arrangement along the passageway.

The movement guide may have radially outward projecting formations or radially inward reaching recesses on the radially external side of the conducting section, which together with corresponding mating formations of the float arrangement can ensure a rotational firmness of the float arrangement against a twisting movement around the passageway. For this, the float arrangement may likewise have on its side pointing radially inward toward the conducting section at least one radially inwardly projecting projection or at least one radially outwardly extending recess, which stands in a form fitting engagement with the corresponding formations of the conducting section and thus prevents a rotary movement of the float arrangement around the passageway.

In order for the operating fluid rising up from the automotive fluid tank interacting with the filling pipe arrangement according to the invention to be able to reach and move the float arrangement, it can be provided that a pipe section involved in the forming of the conducting section and surrounded radially on the outside by the section of the float arrangement comprises at least one passage opening extending radially through the pipe section. Through the at least one passage opening operating fluid rising in the filling pipe arrangement can emerge from the conducting section and reach the float arrangement and ensure buoyancy there. The at least one passage opening may be provided in a region along the passageway on the conducting section in which a free jet emerging from the output end section of the delivery device when the output end section is properly introduced into the inserting end section flows past the at least one passage opening. The free jet may then be deflected by fluid rising opposite it and flow at least partly through the at least one passage opening to the float arrangement.

Alternatively or additionally, as a further possibility of generating buoyancy in the operating fluid rising in the filling pipe arrangement, it may be provided that the float arrangement comprises a float pipe section which forms a pipe section of the passage.

Another benefit of this embodiment is that, when the output end section is introduced into the inserting end section to prepare for a filling process, the float pipe section is carried along by the output end section and thus can be placed in a defined position as the output position, so that it is ensured that the magnetic arrangement finds itself precisely in that position in which it can bring about for example the opening of a safety valve provided in the output end section when the output end section is properly introduced into the filling pipe arrangement.

The float pipe section is therefore preferably in a region of the filling pipe arrangement which surrounds the output end section when the output end section has been properly introduced as designed.

Since the providing of the float pipe section makes possible the greatest possible radial approaching of the float arrangement to the passage and thus to the output end section when the latter is introduced into the filling pipe arrangement, in order to achieve the strongest possible magnetic field strength in the passage it is preferable to provide the magnetic arrangement overlapping along the passageway with the float pipe section, preferably entirely in the region of the float pipe section at the float arrangement. Then the magnetic arrangement may also be arranged radially near the passage.

Basically, one may consider fabricating and mounting the float arrangement from several components, in order to achieve the most secure possible buoyancy action. But in order to reduce the number of components, it is preferable to form the float arrangement as a single piece. Through suitable choice of material and/or shape of the float arrangement, one may ensure sufficient displacement of operating fluid, so that operating fluid rising up in the filling pipe arrangement can move the float arrangement with the jointly movable magnetic arrangement along the passageway. Since this movement will usually involve a buoyancy movement, this also occurs against the action of gravity.

In order to ensure that the magnetic arrangement can assume a predetermined relative position to the passage and thus to an output end section of the delivery device inserted into the inserting end section, the magnetic arrangement is preferably movable, starting from an end position. This end position is preferably a downstream end position situated closer to the discharge opening in the delivery direction along the passageway. Namely, the magnetic arrangement together with the float arrangement can be moved into this end position when the output end section is introduced into the filling pipe arrangement, for example by friction locking between the float pipe section and an outer side of the output end section. Furthermore, the magnetic arrangement will also be biased into this downstream end position by gravity in the case of a typical mounting of the filling pipe arrangement on a motor vehicle.

Preferably, the magnetic arrangement is also limited in its mobility in the other direction, in order to ensure a restoring of the magnetic arrangement to the downstream end position as the preferential starting position of the magnetic arrangement.

Thus, according to one preferred modification of the invention, it is provided that the magnetic arrangement is movable—with respect to a delivery direction along the passageway during a proper filling process of a tank connected to the filling pipe arrangement—between an upstream end position situated closer to the inserting end and a downstream end position situated closer to the discharge opening.

When operating fluid is filled into a tank provided for this purpose, unavoidably the gas present in the tank is at first displaced by the incoming operating fluid. Without further measures, therefore, the gas pressure and thus the overall pressure in the automotive fluid tank would rise as it is increasingly filled. In order to prevent such a pressure rise, the filling pipe arrangement preferably has a venting conduit. This is likewise preferably formed at least for a portion separate from the passage in the filling pipe arrangement, in order to separately conduct the fluids usually moving opposite each other during the filling process: gas and operating fluid. The venting conduit is thus designed to conduct gas in opposite flow through the filling pipe arrangement during a normal filling process.

In unwanted operating situations in which an emergence of operating fluid may occur against the delivery direction from the filling pipe arrangement, operating fluid may also emerge through the venting conduit from the filling pipe arrangement in the direction of the delivery device. In order to prevent his, according to one advantageous modification of the present invention, one may conceive of the venting conduit being blocked for fluid transport when the magnetic arrangement is in one of its end positions, preferably in the upstream end position, as a blocking end position, and then being released for a fluid transport when the magnetic arrangement is not in the blocking end position.

It does not matter whether the magnetic arrangement itself provides a blocking of the venting conduit in the blocking end position and thus prevents a fluid transport, or whether this is done by a separate component firmly coupled to the magnetic arrangement. For the most secure possible blocking of a fluid transport by the venting conduit, the filling pipe arrangement may comprise a sealing arrangement against which the magnetic arrangement or a component connected to it for joint movement lies in the blocking end position.

Likewise, the magnetic arrangement itself may comprise a sealing arrangement. For example, the magnetic arrangement in a simple yet effective variant of a sealing arrangement may be coated or sheathed by a soft elastic elastomer, such as silicone, silicone rubber, natural rubber, and the magnetic arrangement in the blocking end position may then lie with the coating sealing arrangement so formed against an abutment surface of the filling pipe arrangement for blocking a fluid transport through the venting conduit.

In order to avoid needlessly large numbers of components, at least one portion of the venting conduit may be formed in the inserting end section for the formation of the filling pipe arrangement.

Since a portion of the inserting end section only serves for the introducing of the output end section of the delivery device and this section only receives flow inside the introduced output end section during a normal filling process, an annular gap formed in this region of the inserting end section between inserting end section and output end section introduced therein may serve for the venting of the filling pipe arrangement and/or the automotive fluid tank. Thus, quite generally, a portion of the passage formed in the inserting end section may be part of the venting conduit.

In order to provide a defined amount of fluid for the float arrangement, providing the buoyancy needed for the movement of the float arrangement and the magnetic arrangement connected to it, the filling pipe arrangement may comprise a float chamber, in which the float arrangement is movably received.

Preferably the float chamber forms an annular chamber around the conducting section. The float arrangement may divide the float chamber in which it is received into subchambers. For this, the float arrangement may comprise a base body and a flange spaced apart from it.

The base body of the float arrangement may be tubular, so that it can be easily guided on the likewise preferably tubular conducting section for movement along the passageway. A flange may project radially outward from the base body and this then divides the float chamber into at least two subchambers in succession along the passageway. In the case of a tubular base body, the flange projecting from the base body preferably encircles the base body, especially preferably entirely so. The dividing into subchambers is such along the passageway that preferably one upstream subchamber is formed closer to the inserting mouth and one downstream subchamber closer to the discharge opening.

The float chamber can basically also be the venting conduit. Preferably, this is then possible without perturbation of the fluid flow in the delivery direction if the float chamber is divided by the float arrangement into subchambers, and then preferably the upstream subchamber is part of the venting conduit. The downstream end position of the magnetic arrangement can be defined by the float arrangement, which sits on a section of the float chamber, such as a float chamber bottom, and starting from this position is lifted off or can be lifted off when sufficient buoyancy is present along the passageway.

In its design, the filling pipe arrangement may comprise a first pipe section involved in the forming of the inserting end section, which is designed to introduce the output end section of the delivery device. Preferably, this first pipe section also comprises the inserting mouth. In order to reduce the number of components needed to form the filling pipe arrangement according to the invention, the inserting end section is preferably formed by the first pipe section.

The filling pipe arrangement may also comprise a second pipe section, which contributes to forming the conducting section or preferably forms the latter. Also preferably, therefore, this second pipe section comprises the discharge opening.

Usually in preparation for a filling process the output end section of the delivery device is passed through the first pipe section until the discharge end of the output end section finally comes to lie in the region of extension of the conducting section, so that operating fluid discharged from the output end section in the delivery direction is discharged directly into the conducting section and channeled by the latter through the rest of the filling pipe arrangement.

The two pipe section: first and second pipe section, are therefore formed separate from one another and provided in succession along the passageway.

Preferably, the filling pipe arrangement comprises at least two components, of which a first component comprises the inserting end section and optionally the first pipe section contributing to its formation or forming it, and a second component comprises the conducting section and optionally the second pipe section contributing to its formation or forming it. Insofar as the filling pipe arrangement contains the aforementioned preferred float chamber, this may be formed by both components. This also facilitates the arrangement of the float arrangement in a float chamber so formed.

If the aforementioned first and second pipe sections are provided, being made preferably as injection molded parts and thus made of thermoplastic plastic material, the aforementioned float pipe section is preferably provided along the passageway between the first and the second pipe section. In this way, it is also ensured that an outer side of the output end section when the latter is introduced into the filling pipe arrangement slides along the float pipe section and optionally carries this along in the inserting direction, which coincides with the delivery direction, and moves it into the downstream end position.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
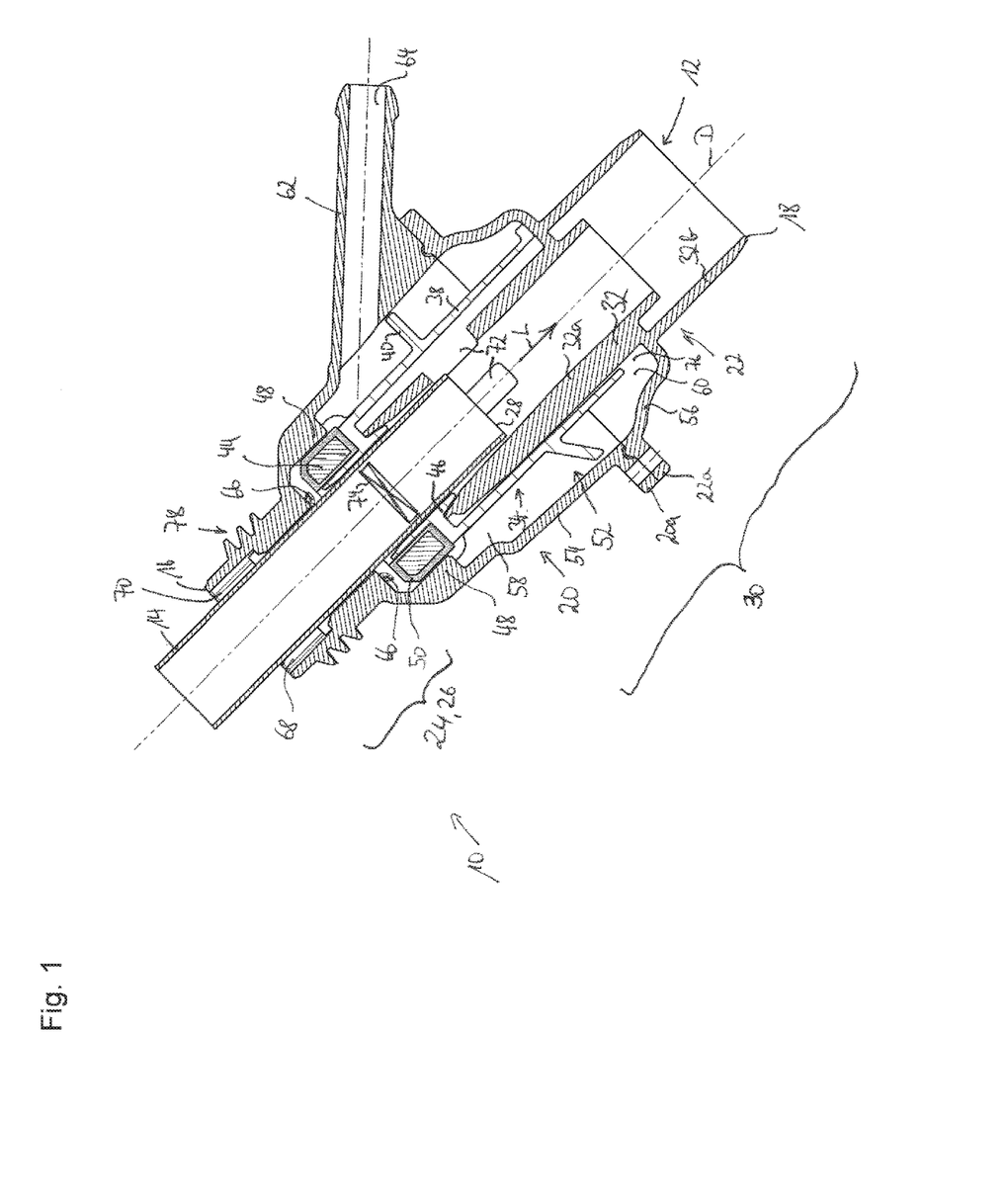
FIG. 1, a longitudinal section view through an embodiment of a filling pipe arrangement according to the invention with output end section of a delivery device introduced therein, with a venting conduit releasing the fluid transport, FIG. 2, the longitudinal section view of FIG. 1 with magnetic arrangement moved into a blocking end position and thus the venting conduit blocked for fluid transport, and FIG. 3, an exploded perspective view of the filling pipe arrangement according to the invention of FIGS. 1 and 2, without the output end section of a delivery device.
Figure 2:
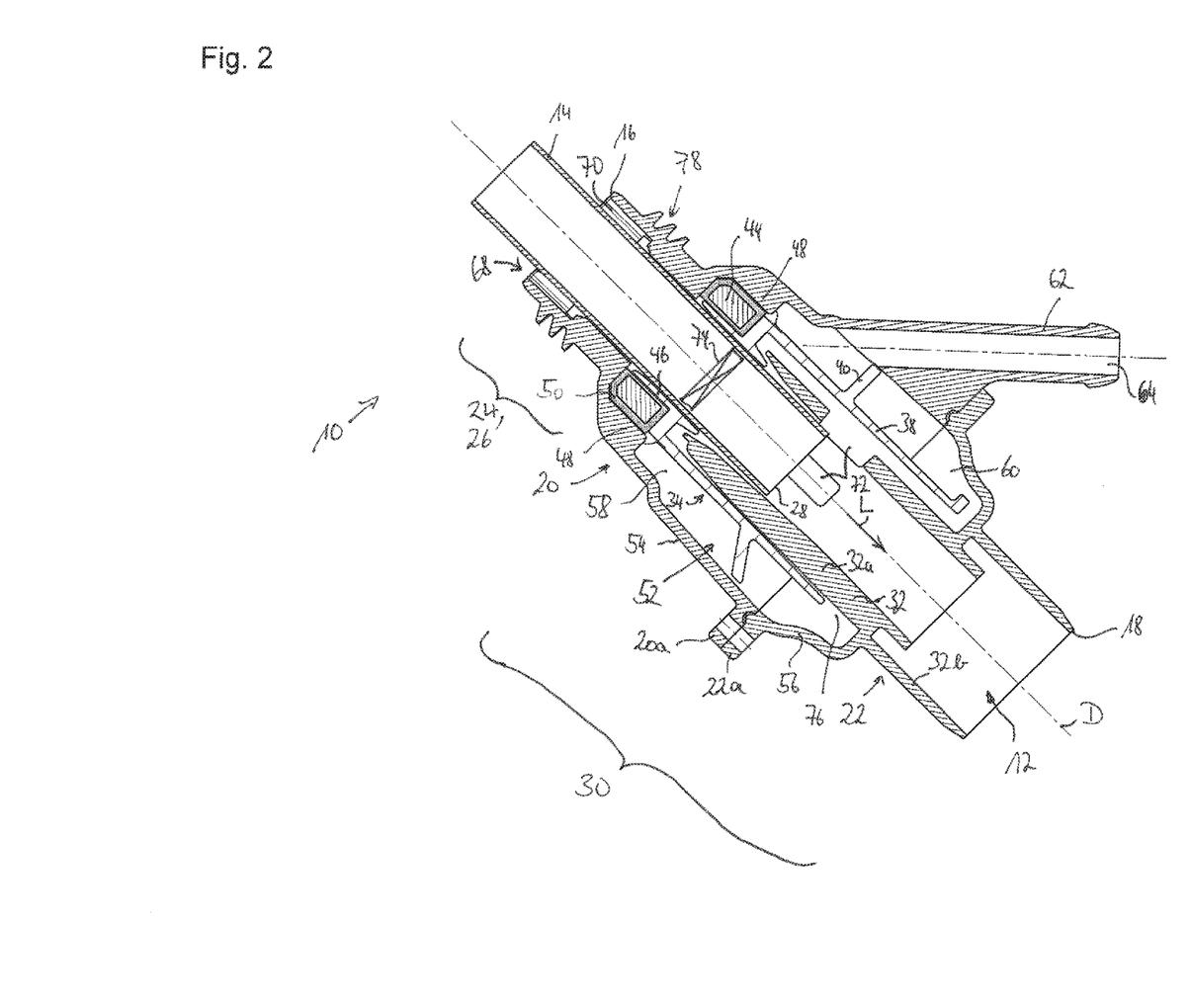
Figure 3:
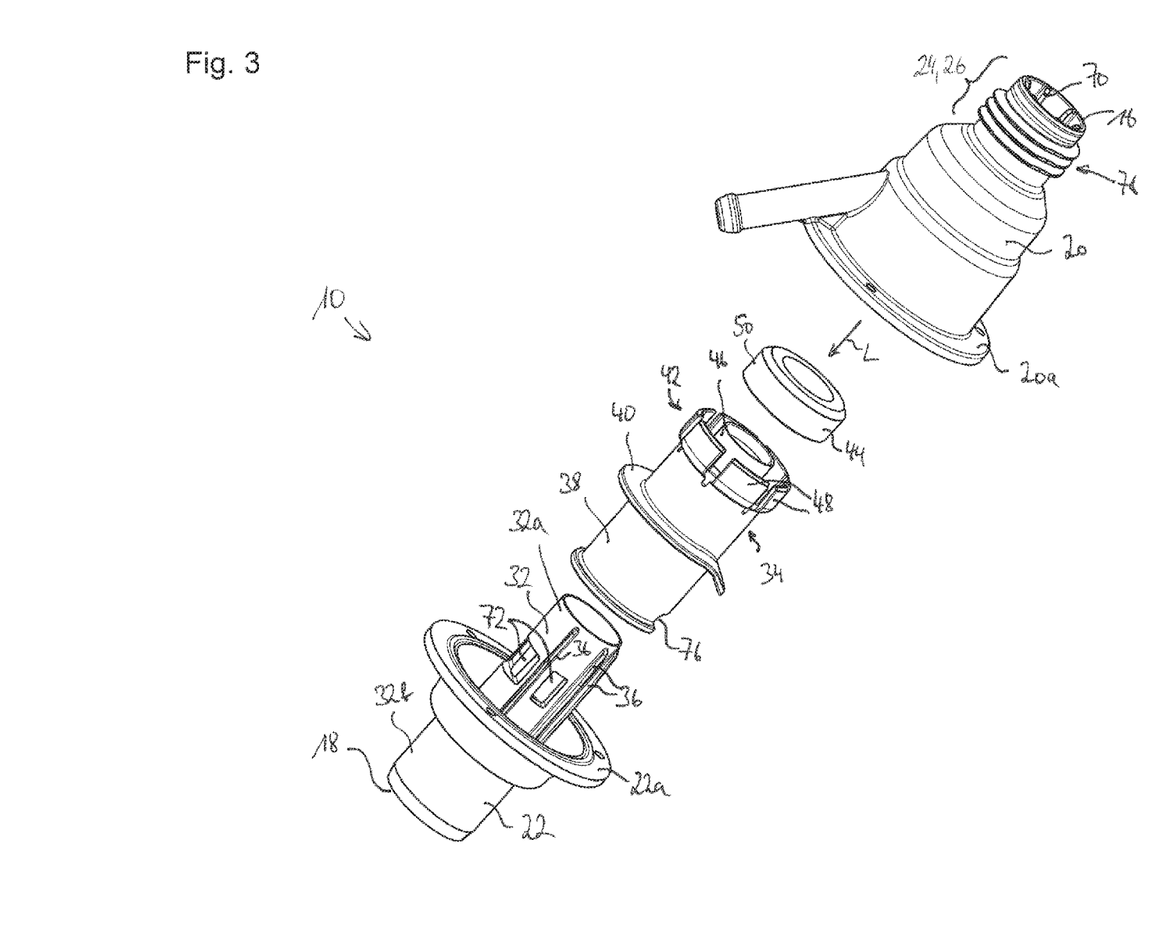

Referring now to the drawings wherein the showings are for the purpose of illustrating preferred and alternative embodiments of the invention only and not for the purpose of limiting the same, FIGS. 1 to 3 show a filling pipe arrangement according to the invention and is designated in general by 10. The filling pipe arrangement 10 comprises a passage 12 extending along a passageway formed preferably as a straight passage axis D. The passage 12 extends in the delivery direction L, which is the direction in which operating fluid is properly dispensed from an output end section 14 for the filling of a tank cooperating with the filling pipe arrangement 10, running in the direction from an inserting mouth 16 to a discharge opening 18.

The filling pipe arrangement 10 in the example depicted comprises an upper component 20 and a lower component 22 connected to it along flanges 20a and 22a. The upper component 20 comprises the inserting mouth 16, the lower component 22 comprises the discharge opening 18.

On the upper component 22 there is furthermore formed a first pipe section 24, which forms an inserting end section 26 of the passage 12, into which an output end section 14 of a delivery device may be introduced along the passage axis D, starting from the inserting mouth 16. In FIGS. 1 and 2 there is shown a tubular output end section 14 introduced into the filling pipe arrangement 10.

The inserting end section 24, which extends starting from the inserting mouth 16 in the delivery direction L along the passage axis D, is entirely penetrated by the output end section 14 in the ready for filling state shown in FIG. 1. A discharge opening 28 of the output end section 14 lies in the section of the passage 12 occupied by a conducting section 30 axially in regard to the passage axis D. The conducting section 30 comprises a second pipe section 32 formed on the lower component 22, which serves to conduct operating fluid emerging from the discharge opening 28 of the output end section 14 in the delivery direction L along the passage 12.

The conducting section, which comprises the discharge opening 18, is formed with two different diameters, i.e., the second pipe section 32 is divided into two regions, namely, a region 32a with narrower diameter, lying further from the discharge opening 18, and a region 32b with larger diameter, lying closer to the discharge opening 18 and encompassing the latter.

The second pipe section 32, more precisely the region 32a with smaller diameter in the depicted figure, is surrounded by a float arrangement 34, which is guided on the second pipe section 32 for movement between the downstream end position represented in FIG. 1 and the upstream end position represented in FIG. 2 relatively to the upper and lower components 20 and 22.

As shown by FIG. 3, it is possible to provide radial ribs 36 running in the axial direction and projecting in the radial direction on the radially outer side of the second pipe section 32, in order to create if so desired a radial gap between the float arrangement 34 and the second pipe section 32 and/or form a form-fitting antitwist formation for the float arrangement 34.

The float arrangement 34 comprises a tubular base body 38, from which a flange 40 projects radially outward roughly in the axial middle with respect to the passage axis D. The flange 40 runs entirely around the base body 38.

At its lengthwise end situated closer to the inserting mouth 16 in the mounted condition the float arrangement 34 comprises a locating formation 42 (see FIG. 3), which serves for locating a permanent magnetic arrangement 44 on the float arrangement 34 for joint movement along the passage axis D.

The permanent magnetic arrangement 44 is in the shape of a ring and runs entirely around the passage 12 and the passage axis D.

Radially inward, the ring-shaped permanent magnetic arrangement 44 is penetrated by a float pipe section 46, which centers the permanent magnetic arrangement 44 in regard to the common passage axis D.

Radially outward, the permanent magnetic arrangement is surrounded by fins 48 shown entirely only in FIG. 3, being arranged in the circumferential direction around the passage axis D at an interval from each other, in order to provide a possibility of rotational fixation also at the lengthwise end of the float arrangement 34 closer to the inserting mouth 16, which in cooperation with radial projections 48 in the upper component 20 secure the float arrangement 34 against a twisting about the passage axis D. The permanent magnetic arrangement 44, which may be sheathed by a soft elastic polymer 50, especially an elastomer, such as silicone, silicone rubber, natural rubber, and so forth, is thus firmly connected to the float arrangement 34 for joint movement along the passage axis D between the end positions shown in FIGS. 1 and 2. This connection may be produced by form fitting and/or by a bonding between them.

The upper and the lower component 20 and 22 furthermore form a float chamber 52, in which the float arrangement 34 is received. The float chamber 52 is bounded radially on the outside by wall sections 54 and 56. In this way, a defined volume is provided for the float arrangement 34, in which sufficient buoyancy is provided once a predetermined amount of fluid has collected therein to move the float arrangement 34 together with the permanent magnetic arrangement 44 against the force of gravity from the downstream end position shown in FIG. 1 to the upstream end position shown in FIG. 2.

The float chamber 52 is divided by the flange 40 into an upstream chamber 58 and a downstream chamber 60.

A connecting pipe 62 of a venting conduit 64 emerges into the upstream subchamber 58 and extends via openings 66 and an annular gap 68 as far as the inserting mouth 16. In order to provide a defined radial gap between the inserting mouth 16 and the output end section 14 introduced into the inserting end section and thereby enable a venting of the automotive fluid tank interacting with the filling pipe arrangement 10, radial ribs 70 may be provided radially on the inside in the inserting end section.

The venting conduit 64 is connected to an automotive fluid tank not represented in FIGS. 1 to 3 and interacting with the filling pipe arrangement 10 in order to take away gas flowing in the opposite direction to a filling fluid during a filling process, which is displaced from the tank by fluid entering the fluid tank.

In order for the float chamber 52, especially the downstream subchamber 60, to be filled with operating fluid and thus produce a buoyancy for the movement of the float arrangement 34, passage openings 72 are formed in the second pipe section 32, more precisely its smaller-diameter section, extending radially through the entire second pipe section 32.

If for whatever reason fluid rises up in undesirable manner during a filling process against the delivery direction L along the passages axis D to the inserting mouth 16, this will pass through the passage openings 72 into the float chamber 52 and, regardless of its amount, begin to move the float arrangement 34, preferably designed as a single piece, into the blocking end position shown in FIG. 2.

The rising of operating fluid against the delivery direction L, in addition to simply moving through, may also deflect the direction of flow of fluid emerging through the discharge opening 28 in the delivery direction L and additionally ensure a rapid filling of the float chamber 60.

As indicated only in rough schematic manner in FIGS. 1 and 2, a valve device 74 is formed in the output end section 14 of the delivery device, which is moved into an open position when the valve device 74 is in the position indicated in FIG. 1 relative to the permanent magnet arrangement 44 by the magnetic field of the permanent magnetic arrangement 44 reaching into the passage 12 and thus enables a transport of operating fluid in the delivery direction L through the output end section 14. The valve arrangement 74 is a closed valve arrangement 74 without the action of the magnetic field of the permanent magnetic arrangement 44.

When operating fluid rises in undesirable manner during a filling process against the delivery direction L in the filling pipe arrangement 10 toward the inserting mouth 16 and finally emerges through the passage openings 72 into the float chamber 52, the float arrangement 34 begins to move into the blocking end position shown in FIG. 2.

Thanks to the fact that the permanent magnetic arrangement 44 is likewise moved with the float arrangement 34 against the delivery direction L along the passage axis D, the valve mechanism 74 in the output end section 14 situated unchanged relative to the filling pipe arrangement 10 is no longer in the relative position necessary for a movement into the open position. Due to the movement of the magnetic arrangement 44, the valve arrangement 74 closes and there is an immediate end to the delivery, so that further rising of the operating fluid toward the inserting mouth 16 is prevented. It is thus possible to prevent an emergence of operating fluid on the outside against the delivery direction L through the inserting mouth 16.

The configuration of the float pipe section 46 can ensure that, when an output end section 14 is again introduced into the filling pipe arrangement 10 in the delivery direction L, the float arrangement 34 is again moved back to the downstream end position shown in FIG. 1 by virtue of frictional contact between the outer side of the output end section 14 and the facing side of the float pipe section 46, pointing radially inward, in which a dispensing of operating fluid is possible through the output end section 14 into the passage 12 solely due to the then possible relative position between valve mechanism 74 and permanent magnetic arrangement 44.

Through small channels, not shown, in the transition region between the smaller-diameter region 32a and the larger-diameter region 32b, a float chamber 52 filled with operating fluid can be gradually emptied once more through the section of the passage 12 which is bounded by the larger-diameter conducting section region 32b. The emptying rate can be controlled by the cross sectional flow area of one or more of the small channels.

By an opening 76 at the length side of the float arrangement 34 closer to the discharge opening 18 one can ensure that operating fluid passing through the passages openings 72 gets into the float chamber 52 from the space between float arrangement 34 and the second pipe section 32.

It should be added that the inserting end section 24 in familiar manner has a thread 78 on its radially outer side in order to attach a Kruse bottle or some other reservoir container.

Moreover, the filling pipe arrangement preferably has an axial end stop, which ensures that the output end section is always introduced by the same inserting depth into the passage.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A filling pipe arrangement for filling an automobile fluid tank with fluid comprising: a passage and a magnetic arrangement; wherein the passage comprises an inserting end section and wherein the inserting end section comprises an insertion mouth; and wherein the passage comprises a conducting section and wherein the conducting section comprises an discharge opening, wherein the passage passes through the filling pipe arrangement along a predetermined passageway, wherein the passage extends from the insertion mouth to the discharge opening, wherein the inserting end section is designed to hold at least temporarily an associated output end section of an associated delivery device wherein the conducting section is provided at a distance from the insertion mouth and designed to lead associated fluid introduced into the filling pipe arrangement through the filling pipe arrangement, wherein a magnetic field of the magnetic arrangement reaches into the passage in one section of the passageway, wherein the magnetic arrangement is received in the filling pipe arrangement so that it is movable along the passageway, the filling pipe arrangement further including a float arrangement which is received in the filling pipe arrangement and able to move along the passageway, the magnetic arrangement being connected relative to the float arrangement for joint movement along the passageway, wherein at least one section of the float arrangement surrounds a length region of the conducting section on a radial outside.

2. The filling pipe arrangement according to claim 1, wherein a pipe section involved in the forming of the conducting section and surrounded on the radial outside by the section of the float arrangement, has at least one passage opening extending radially through the pipe section.

3. The filling pipe arrangement according to claim 1, wherein the float arrangement is designed as a single piece.

4. The filling pipe arrangement according to claim 1, wherein the magnetic arrangement is movable with respect to a delivery direction along the passageway during a proper filling process of an associated tank connected to the filling pipe arrangement between an upstream end position situated closer to the insertion mouth and a downstream end position situated closer to the discharge opening.

5. The filling pipe arrangement according to claim 4, further including a venting conduit formed at least for a portion separate from the passage, which is designed to during a normal filling process conduct gas through the filling pipe arrangement in a direction opposite to the delivery direction, wherein the venting conduit is blocked for fluid transport when the magnetic arrangement is in one of the upstream end position and the downstream end position as a blocking end position, and then released for a fluid transport when the magnetic arrangement is not in the blocking end position.

6. The filling pipe arrangement according to claim 5, wherein the blocking end position is the upstream end position.

7. The filling pipe arrangement according to claim 5, further including a sealing arrangement, against which lies the magnetic arrangement or a component connected to the magnetic arrangement for joint movement in the blocking end position.

8. The filling pipe arrangement according to claim 5, wherein at least one part of the venting conduit is formed in the inserting end section.

9. The filling pipe arrangement according to claim 5, wherein a part of the passage formed in the inserting end section is part of the venting conduit.

10. The filling pipe arrangement according to claim 1 further including a float chamber in which the float arrangement is movably received.

11. The filling pipe arrangement according to claim 10, wherein the float arrangement comprises a base body and a flange which divides the float chamber into two subchambers in succession along the passageway.

12. The filling pipe arrangement according to claim 10 further including a venting conduit formed at least for a portion separate from the passage, which is designed to during a normal filling process conduct gas through the filling pipe arrangement in a direction opposite to the delivery direction, wherein the venting conduit is blocked for fluid transport when the magnetic arrangement is in one of the upstream end position and the downstream end position as a blocking end position, and then released for a fluid transport when the magnetic arrangement is not in the blocking end position, the float chamber is part of the venting conduit.

13. The filling pipe arrangement according to claim 11 further including a venting conduit formed at least for a portion separate from the passage, which is designed to during a normal filling process conduct gas through the filling pipe arrangement in a direction opposite to the delivery direction, wherein the venting conduit is blocked for fluid transport when the magnetic arrangement is in one of the upstream end position and the downstream end position as a blocking end position, and then released for a fluid transport when the magnetic arrangement is not in the blocking end position, wherein the two subchambers includes an upstream subchamber and a downstream subchamber, the upstream subchamber being part of the venting conduit.

14. The filling pipe arrangement according to claim 1, further including a first pipe section forming at least of part of the inserting end section and a second pipe section forming at least a part of the conducting section, wherein the first and the second pipe sections are formed in components spatially separate from each other and provided in succession along the passageway.

15. The filling pipe arrangement according to claim 14 wherein the float arrangement comprises a float pipe section which forms a pipe section of the passage, and the magnetic arrangement is provided along the passageway overlapping with the float pipe section on the float arrangement, the float pipe section is provided along the passageway between the first and the second pipe section.

16. A filling pipe arrangement for filling an automobile fluid tank with fluid comprising: a passage and a magnetic arrangement; wherein the passage comprises an inserting end section and wherein the inserting end section comprises an insertion mouth; and wherein the passage comprises a conducting section and wherein the conducting section comprises an discharge opening, wherein the passage passes through the filling pipe arrangement along a predetermined passageway, wherein the passage extends from the insertion mouth to the discharge opening, wherein the inserting end section is designed to hold at least temporarily an associated output end section of an associated delivery device, wherein the conducting section is provided at a distance from the insertion mouth and designed to lead associated fluid introduced into the filling pipe arrangement through the filling pipe arrangement, wherein a magnetic field of the magnetic arrangement reaches into the passage in one section of the passageway, wherein the magnetic arrangement is received in the filling pipe arrangement so that it is movable along the passageway, the filling pipe arrangement further including a float arrangement which is received in the filling pipe arrangement and able to move along the passageway, the magnetic arrangement being connected relative to the float arrangement for joint movement along the passageway, wherein the float arrangement comprises a float pipe section which forms a pipe section of the passage, and the magnetic arrangement is provided along the passageway overlapping with the float pipe section on the float arrangement.

17. A filling pipe arrangement for filling an automobile fluid tank with fluid comprising: a passage and a magnetic arrangement; wherein the passage comprises an inserting end section and wherein the inserting end section comprises an insertion mouth; and wherein the passage comprises a conducting section and wherein the conducting section comprises an discharge opening, wherein the passage passes through the filling pipe arrangement along a predetermined passageway, wherein the passage extends from the insertion mouth to the discharge opening, wherein the inserting end section is designed to hold at least temporarily an associated output end section of an associated delivery device, wherein the conducting section is provided at a distance from the insertion mouth and designed to lead associated fluid introduced into the filling pipe arrangement through the filling pipe arrangement, wherein a magnetic field of the magnetic arrangement reaches into the passage in one section of the passageway, wherein the magnetic arrangement is received in the filling pipe arrangement so that it is movable along the passageway, wherein the magnetic arrangement is movable with respect to a delivery direction along the passageway during a proper filling process of an associated tank connected to the filling pipe arrangement between an upstream end position situated closer to the insertion mouth and a downstream end position situated closer to the discharge opening, the filling pipe arrangement further including a venting conduit formed at least for a portion separate from the passage, which is designed to during a normal filling process conduct gas through the filling pipe arrangement in a direction opposite to the delivery direction, wherein the venting conduit is blocked for fluid transport when the magnetic arrangement is in one of the upstream end position and the downstream end position as a blocking end position, and then released for a fluid transport when the magnetic arrangement is not in the blocking end position.

\* \* \* \* \*